United States Patent [19]

Martin et al.

[11] Patent Number: 5,198,645
[45] Date of Patent: Mar. 30, 1993

[54] CHIP CARD RECEIVING AND SENSING ASSEMBLY FOR THICK AND THIN CARDS

[75] Inventors: Paul-Antoine Martin, Marly-Le-Rot; Jean Quintana, Cergy, both of France

[73] Assignee: Societe D'Applications Generales d'Electricite et de Mecanique A Gem, France

[21] Appl. No.: 431,349

[22] Filed: Nov. 3, 1989

[30] Foreign Application Priority Data

Nov. 9, 1988 [FR] France ............................ 88 14610

[51] Int. Cl.$^5$ ............... H01R 23/70; G06K 7/06; G06K 13/06; G06K 13/24
[52] U.S. Cl. ........................... 235/441; 235/483; 235/485; 439/630
[58] Field of Search ................ 235/441, 479, 483, 484, 235/485, 486, 492; 439/630, 218, 217

[56] References Cited

U.S. PATENT DOCUMENTS

| | | | |
|---|---|---|---|
| 4,046,994 | 9/1977 | Prohaska ............................. | 235/441 |
| 4,692,602 | 9/1987 | Conant ................................. | 235/449 |
| 4,717,817 | 1/1988 | Grassl et al. ....................... | 235/441 |
| 4,799,891 | 1/1989 | Reichardt et al. ................. | 439/43 |
| 4,833,310 | 5/1989 | Shimamura et al. ............. | 235/492 |
| 4,869,672 | 9/1989 | Andrews, Jr. ...................... | 439/630 |
| 4,926,032 | 5/1990 | Shimamura et al. ............. | 235/441 |
| 4,976,630 | 12/1990 | Schuder et al. ..................... | 235/441 |
| 4,990,758 | 2/1991 | Shibano et al. .................... | 235/441 |
| 5,015,830 | 5/1991 | Masuzawa et al. ................ | 385/441 |
| 5,017,764 | 5/1991 | Hashimoto et al. ............... | 235/441 |

FOREIGN PATENT DOCUMENTS 2607291 11/1986 European Pat. Off. .
62-75887 9/1987 Japan .

*Primary Examiner*—Stuart S. Levy
*Assistant Examiner*—Christopher R. Glenbocki

[57] ABSTRACT

A card reader receives electronic chip cards of different thicknesses including relatively thick and thin chip cards, each card having electrical interface connection terminals thereon. The reader includes a front panel having a card introduction opening. A first mating connector is positioned to engage the interface connection terminals of the thick chip cards. A fixed first guide positions the interface connection terminals of the thick cards into engagement the first mating connector. A second mating connector is positioned to engage the interface connection terminals of the thin chip cards. A moveable second guide means guides the interface connection terminals of the thin chip cards into engagement with the second mating connector. The second guide is retractable under action of introduction of the thick cards against a resilient return means.

17 Claims, 2 Drawing Sheets

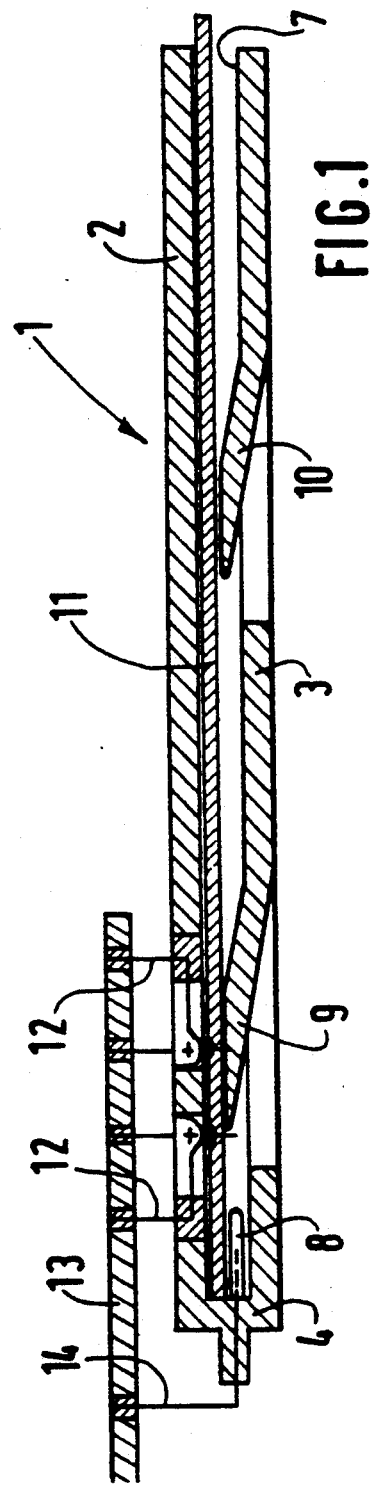
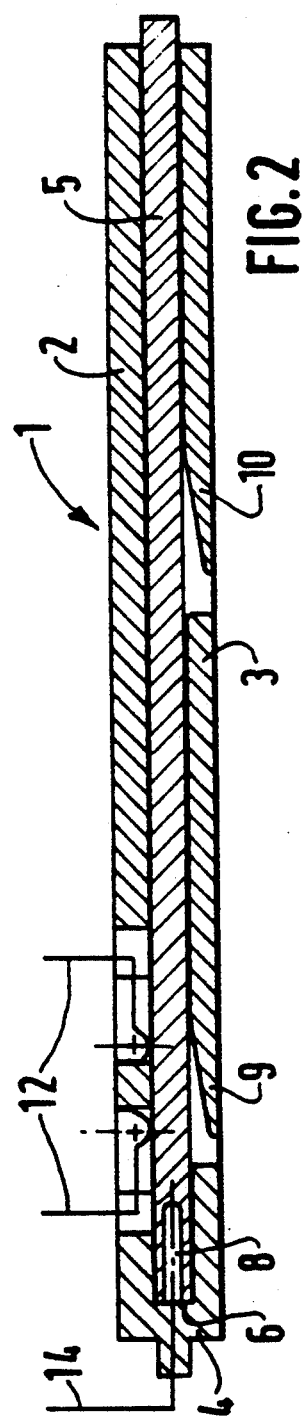
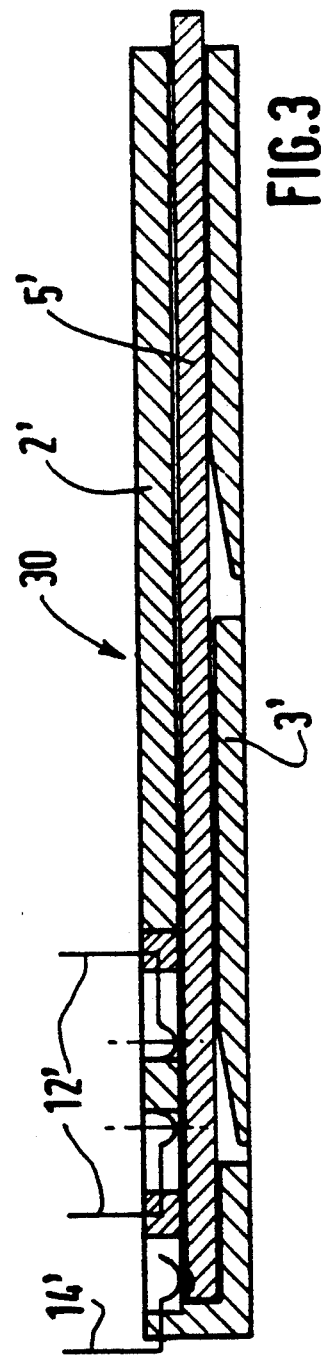

CHIP CARD RECEIVING AND SENSING ASSEMBLY FOR THICK AND THIN CARDS

The present invention relates to chip cards and their receivers.

Chip cards, also called memory cards, are cards generally made from plastic material having a general rectangular shape and of a certain thickness, in which a chip or substrate is buried on which are integrated electronic components connected in one way or another to accessible contact terminals either implanted at the surface or disposed so as to form, on one of the edges of the cards, a male or female type connection strip. For use of such a card, it must be connected electrically to an integrating apparatus or itself connected to a receiver comprising a connection member for exchanging information between the card and the apparatus.

Now, existing cards do not all have the same thickness nor the same rigidity.

With connector type, thickness and rigidity being thus parameters which vary from one card to another, constructors have therefore been led to offer as many receivers as there are card types.

The Applicant has sought to define a universal or multicard receiver, capable of receiving any type of card and it is thus that he proposes his invention.

The present invention relates to a receiver for chip cards having connection terminals, with a card introduction opening, at least one connector adapted for cooperating with the card terminals of substantially pre-determined thickness, and fixed means for guiding these cards until they cooperate with the connecting connector, which receiver is characterized by the fact that it comprises means for guiding other cards of smaller thickness and other connecting means adapted for cooperating with the terminals of said other cards, the means for guiding said other cards being retractable under the action of the introduction of said cards of greater thickness and against the action of return means.

Advantageously, the width of the introduction opening of the receiver of the invention is substantially equal to that of the cards of greater thickness intended to be introduced therein.

In a first embodiment of the receiver of the invention, the connector for connecting the cards of greater thickness and the connecting means for connecting the cards of smaller thickness comprise connection terminals projecting from the same side of the receiver, substantially perpendicular to the plane of the introduction opening.

One of the advantages offered by such an embodiment resides in the possibility for all the connection terminals of the receiver to be taken up by a single printed circuit card.

The retractable means for guiding the cards of smaller thickness may comprise resilient means fast with the fixed guide means, advantageously on the side opposite the receiver.

The connector for connecting the cards of greater thickness may comprise connection terminals either accessible at the bottom of the receiver, parallel to the plane of the introduction opening, for cards with connection terminals implanted on the edge, or directly implanted on one side of the receiver further carrying the terminals of the connecting means connecting the smaller thickness cards, for cards of greater thickness with connection terminals on the surface.

Another advantage of all these embodiments of the receiver of the invention resides is its minimum size.

In yet a different embodiment, said retractable guide means are adapted for guiding the smaller thickness cards in a direction slanted with respect to the guide direction of the fixed guide means.

Advantageously, the width of the introduction opening is substantially equal to the thickness of the cards of greater thickness intended to be introduced therein and the depth of the opening makes any pivoting of these cards in the opening difficult.

Preferably, resilient means, retractable by the greater thickness cards, are disposed so as to deflect and guide the cards of smaller thickness after they have been introduced into the opening of the receiver.

Again preferably, the return force of the resilient means is pre-determined so that they are not retracted by cards of smaller thickness pushed by the users.

To reduce the risk that, when it is a question of flexible cards of smaller thickness, the users, by incorrect handling, cause retraction of the resilient means, it is advantageous for the receiver of the invention to comprise a slide, or cradle, for receiving the cards, mounted for sliding parallel to the guide direction of the fixed guide means and adapted for nevertheless permitting cooperation of the smaller thickness cards and the retractable guide means.

Thus, for inserting his deformable card in cooperation with the appropriate connector of the receiver, the user has only to push the drawer and not the card, so without danger of deforming the card.

The advantage of these embodiments with several paths for guiding cards of different thicknesses resides in the possibility of using commercially available connectors.

The invention will be better understood from the following description of several embodiments of the receiver of the invention, with reference to the accompanying drawings in which:

FIG. 1 shows a schematic sectional view of a first embodiment of the multicard receiver of the invention, with a thin card;

FIG. 2 shows the receiver of FIG. 1 with a thick card having contact terminals implanted on its edge;

FIG. 3 shows a sectional view of a second embodiment of the receiver of the invention with a thick card having contact terminals implanted on its surface;

Figure 4:
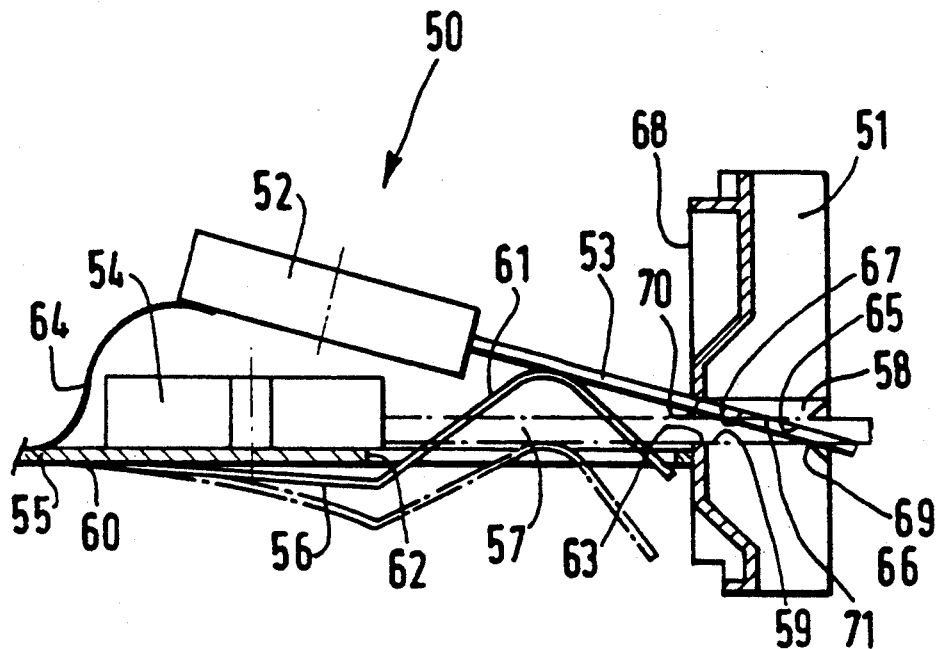
FIG. 4 shows a view partially in section of a third embodiment of the receiver of the invention, with commercially available connectors.

The receiver 1 shown schematically in FIGS. 1 and 2, here made from a plastic material, has a general elongate parallelepipedic shape. It comprises an upper face 2 and a lower face 3, which are parallel and joined together at one side by a bottom 4 and forming on the other side an opening 7 for the introduction of thick cards 5 with a chip connected to contact terminals of a female type connection strip implanted on one 6 of the transverse edges of cards 5. The reception space, formed between faces 1 and 2 of the receiver, has a thickness substantially equal to that of cards 5. A male type connector 8 is implanted on the bottom 4 of the receiver for receiving the female strip of cards 5 and cooperates electrically therewith. The contact terminals 14 of connector 8 project from the receiver perpendicularly to bottom 4. Two tongues 9, 10 are here formed by die-stamping the lower face 3 so that, in the rest position, they project into the reception space of the receiver as far as the plane parallel to the upper face 2 and at a distance therefrom substantially equal to the thickness of the thin cards 11 with the chip connected to contact terminals implanted on the surface. The plane of the free ends of the tongues extends between the upper face 2 and connector 8. By construction, tongues 9, 10 are mounted resiliently articulated to the lower face 3.

Connection terminals 12 are implanted in the upper face 2 so as to project very slightly into the reception space of the receiver and cooperate electrically with the contact terminals of the thin cards 11.

The connection terminals 12 of the thin cards 11 and those 14 of connector 8 connecting the thick cards 5 are taken up on a single printed card 13 extending along the upper face 2 of the receiver.

The depth of the receiver 1, between bottom 4 and the introduction opening 7, is here substantially less than the length of chip cards 5, 11.

Such as described, receiver 1 may therefore receive, through the single opening, thick cards and thin cards.

When a thick and rigid card 5 is introduced, it is guided on one side by the upper face 2 and on the other side by the lower face 3. Under the action of introducing the card pushed by the user, tongues 9, 10 are pushed back towards the lower face 3 by the edge 6 of the card carrying the connection strip before these tongues 9, 10 retract under the card 5. The user continues to push his card until it is engaged on connector 8 and until the electric terminals of the card and of the connector are connected electrically together, the card projecting slightly out of the introduction opening 7 (FIG. 2). To remove the card from the receiver, it is sufficient for the user to take hold of the portion projecting from the receiver. By pulling the card from the receiver, tongues 9, 10 both assume their rest position under the action of the resilient return force of their articulation.

When a thin card 11 is introduced, by its face opposite that carrying the thin card terminals of the chip implanted at the surface, it rapidly meets the first tongue 10, then the second tongue 9, which will guide it on one side, the upper face 2 guiding it on the other side. The user continues to push his card until, after the edge of the card engaged in the receiver has passed between the upper face 2 and connector 8 for thick cards, the connection terminals of its chip and terminals 12 are connected electrically together, the card projecting from the introduction opening 7 (FIG. 1).

Receiver 30 of FIG. 3 is identical to that of FIGS. 1 and 2, except that it is intended to receive thick cards 5' with contact terminals implanted at the surface and not on an edge and that, for that, the upper face 2' is provided with a set of contact terminals 14' projecting slightly into the reception space between the upper and lower faces 2', 3' for cooperating electrically with the contact terminals of cards 5'. Thus, in receiver 30, all the connection terminals, those 14' for the thick cards as well as those 12' for the thin cards are implanted on the same side of the receiver, namely the upper face 2'.

Receiver 50 shown schematically in FIG. 4 comprises a front face 51 in which an opening 59 is formed for the introduction of cards, thick and rigid cards 57, thin and flexible cards 53. The receiver comprises two commercially available connectors 54 for the thick cards and 52 for the thin cards. Connector 54 is carried by a printed circuit card 55. A spring blade 56 is fixed by one end 60 under card 55, substantially in line with connector 54. The free end 61 of blade 56 has a bent shape which, in the rest position of the blade, projects out of a window 62 formed in card 55.

The thick card connector 54 and the introduction opening 59 of the receiver extend substantially at the same level. More precisely, the printed circuit 55, on which connector 54 rests, extends slightly below the plane of the lower edge 63 of opening 59. The thin card connector 52 extends, above the connector 54, in a plane slanted with respect to that of opening 59 and connector 54. The output terminals of connector 52 are connected to the printed circuit card 55 by a flexible connecting film 64.

A guide rib 58 extends into the introduction opening 59 and over the whole depth thereof adjacent its upper edge 65. It has two guide surfaces, one 65 for the thick cards, proximate the external wall 66 of the front face 61 of the receiver, the other 67 for the thin cards, proximate the inner wall 68 of the front face, the surface, or ramp, 67 extending between solid angle 71 connecting the two surfaces 65, 67 together and the rear solid angle 70 of the upper edge of the introduction opening.

The width between the parallel planes of the guide surface 65 and the lower edge 63 of the introduction opening correspond substantially to that of the cards.

The plane of the guide surface 67 practically merges with that of the thin card connector 52, i.e. it is practically parallel to the direction of introduction of the thick cards 57.

The depth of the guide surface 65 for the thick cards makes it difficult, if not impossible, for the latter to pivot in opening 59. Furthermore, this depth of the guide surface 65 for the thick cards, substantially from the external wall 66 of the front face as far as the solid connecting angle 71, is such that the plane of ramp 67 and the front angle of intersection 69 of the lower edge 59 of the introduction opening form a width corresponding substantially to that of the thin cards.

In the rest position of blade 56, its bend 61 extends substantially in the plane parallel to that of ramp 67 containing the front solid angle 69.

Such as described, receiver 50 may therefore receive thick cards and thin cards through the single opening 59.

When a thick and rigid card 57 is introduced, it is guided on one side by the guide surface 65 and on the other side by the lower edge 63. Under the action of the introduction of the card pushed by the user, bend 61 of the spring blade 56 is pushed back towards window 62 by the edge of the card engaged in the receiver, before this bend retracts under the card, to assume the position shown with broken lines in FIG. 4. The user continues to push his card until it is engaged in connector 54 and until the electric terminals of the card and of the connector are connected mechanically together, the card projecting slightly from the front face 51. To remove the card from the receiver, it is sufficient for the user to grip it by the portion projecting from the receiver.

When a thin card 53 is introduced, it slides, by its edge engaged in the receiver, over the bend 61 of the blade spring 56 which deflects it and causes it to pivot towards the upper edge 70 of opening 59, substantially about the front solid angle of intersection 69 of the lower edge 59 of the opening or the solid angle of intersection 71 between surfaces 65, 67 and the guide rib 58; the card is then guided on one side by the guide ramp 67 and on the other side by bend 61. The user continues to push his card until it is engaged in connector 52 and until the electric terminals of the card and of the connector are connected mechanically together, the card projecting slightly from the front face 51.

Because of the relative flexibility of the thin cards 53 and so that, instead of sliding over bend 61, a thin card is not blocked for example by a rough portion, bends, tightens and exerts on bend 61, under the action of the user, a force pushing it towards window 62, the spring blade 56 with its bend 61 is dimensioned and its material chosen so that its return force is sufficient to withstand such incorrect handling.

Figure 5:
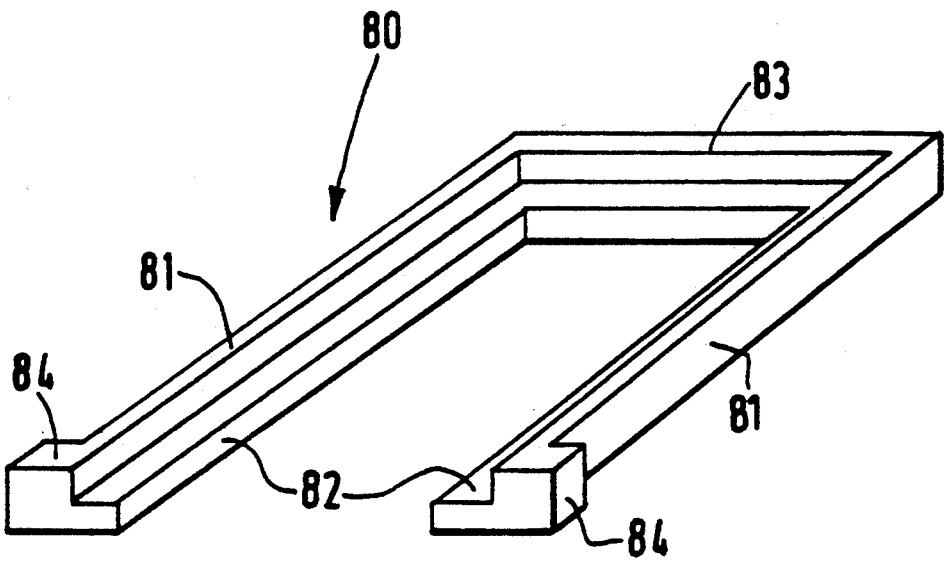
FIG. 5 shows a perspective view of the card transporting drawer of a fourth embodiment of the receiver of the invention.

To reduce the risk of such a circumstance, and referring to FIG. 5, the receiver of FIG. 4 may be slightly modified so that the cards are not introduced and pushed manually by the users, but deposited in a transport drawer 80 mounted for sliding in the receiver.

Drawer 80 has two parallel arms 81 with an L shaped section forming two inner flanges 82 for receiving respectively the two longitudinal edges of the chip cards. The two arms 81 are connected together by a cross piece 83 of the same section. The free ends of the arms are shaped so as to have a shoulder forming a stop flange 84, perpendicular to the plane of the drawer. The length of arms 81 is less than that of the chip cards having a connecting strip on the edge.

The drawer receiver is identical to that of FIG. 4, except that the front face is shaped so that the drawer may slide from a closed position, in which the cross piece 83 is pushed against the front face 51, to an open position in which flanges 84 abut against the rear wall 68 of front face 51. The cross dimension of bend 61 of the spring blade 56 is less than the spacing between the arms 81 of the drawer so that it may provide its function of guiding the thin cards.

For the use of a card, it is sufficient to open the drawer, to place it on flanges 82 through the introduction opening and to close the drawer.

As soon as the edge of the card, engaged first in the receiver, strikes bend 61, the card is pushed back against cross piece 83, if it was not already so, and further action for closing the drawer, if it is a thick card, causes bend 61 to retract, rib 58 preventing it from pivoting, the card, being longer than the arms of the drawer, may then be engaged in connector 54 and, if it is a thin card, cause the card, pushed by cross piece 83, to slide over bend 61 as before.

Of course, the drawer may be moved manually, mechanically, electrically or by any other appropriate means. Similarly, such a drawer could just as well equip the receiver of FIGS. 1 to 3.

The receiver of the invention finds applications in numerous sectors of activity, such as for example as monetary, telecommunications, and in particular in prepayment machines.

We claim:

1. A receiver for chip cards having an interface connection terminal, said receiver having a card introduction opening, first mating connector means adapted for cooperating with the interface connection terminal of thick ones of said chip cards having a first substantially pre-determined thickness, and fixed first guide means for guiding said thick cards until they cooperate with the mating connector, said receiver further comprising second guide means for guiding thin ones of said chip cards of smaller thickness than said thick cards and second mating connector means adapted for cooperating with the interface connection terminal of said thin cards, the second mating connector spaced from the first connector such that when inserted, the thin cards are positioned away from the first mating connector while cooperating with the second mating connector, and the second guide means being retractable under the action of the introduction of said thick cards against the action of return means.

2. The receiver according to claim 1, wherein one of the first mating connector means for connecting the cards of greater thickness and the second mating connector means comprises connection terminals projecting from the receiver, substantially perpendicular to the plane of the introduction opening.

3. The receiver according to claim 1, wherein the second guide means comprises resilient means connected to the first guide means.

4. The receiver according to claim 3, wherein the second guide means comprises at least one tongue articulated resiliently to one of the faces of the receiver, the second mating means having terminals for connecting the thin cards implanted on the other face of the receiver.

5. The receiver according to claim 1, wherein terminals for connecting the thick cards and thin cards are implanted on the same side of the receiver.

6. Receiver according to claim 1, wherein said second guide means are adapted for guiding the cards of smaller thickness in a direction slanted with respect to the guide direction of the fixed guide means.

7. Receiver according to claim 6, wherein the width of the introduction opening is substantially equal to the thickness of the cards of greater thickness intended to be introduced therein.

8. Receiver according to claim 6, wherein the depth of the introduction opening is determined for making any pivoting of the cards of greater thickness in the opening difficult.

9. Receiver according to claim 6, wherein the introduction opening comprises a guide rib having a guide surface parallel to the direction of introduction of the cards of greater thickness and a ramp slanted with respect to this guide surface.

10. Receiver according to claim 6, wherein resilient means retractable by the cards of greater thickness are disposed for deflecting and guiding the cards of smaller thickness after they have been introduced into the opening of the receiver.

11. Receiver according to claim 10, wherein said resilient means comprise a blade one end of which is fixed and the other free end of which has a bent shape.

12. Receiver according to claim 1, wherein a drawer is provided for receiving the cards mounted for sliding parallel to the guide direction of the fixed guide means and adapted for nevertheless permitting cooperation of the cards of smaller thickness and of the retractable guide means.

13. A chip card reader for receiving, in a central cavity, chip cards of different thicknesses including relatively thick and thin chip cards each having interface connection terminals thereon, comprising:
   a front panel including a card introduction opening;
   a first mating connector fixedly mounted and positioned to engage said interface connection terminals of said thick chip cards;
   stationary first guide means for guiding said interface connection terminals of said thick cards into engagement said first mating connector;

a second mating connector fixedly mounted spaced apart from said first mating connector and positioned to engage said interface connection terminals of said thin chip cards the second mating connector spaced from the first connector such that when inserted, the thin cards are positioned away from the first mating connector while cooperating with the second mating connector, and movable second guide means for guiding said interface connection terminals of said thin chip cards into engagement with said second mating connector, said second guide means retractable under action of introduction of said thick cards against a resilient return means.

14. The receiver according to claim 13, wherein first mating connector and the second mating connector comprise respective connection terminals projecting from the receiver into said central cavity.

15. The receiver according to claim 13, wherein the second guide means comprises resilient means connected to the first guide means.

16. The receiver according to claim 15, wherein the second guide means comprises a tongue articulated resiliently to an inner face of the receiver facing said central void, the second mating connector having terminals for connecting the thin cards being implanted on an opposite face of the receiver facing said central void.

17. The receiver according to claim 13, wherein terminals for connecting the thick cards and thin cards are implanted on the same side of the receiver.

* * * * *

UNITED STATES PATENT AND TRADEMARK OFFICE
CERTIFICATE OF CORRECTION

PATENT NO. : 5,198,645

DATED : March 30, 1993

INVENTOR(S) : Paul-Antoine MARTIN et al.

It is certified that error appears in the above-identified patent and that said Letters Patent is hereby corrected as shown below:

On the title page, at [73], "Societe D'Applications Generales d'Electricite et de Mecanique A Gen, France" should read --SOCIETE D'APPLICATIONS GENERALES D'ELECTRICITE ET DE MECANIQUE SAGEN (SOCIETE ANONYME FRANCAISE), FRANCE--

On the title page, after "Assistant Examiner - Christopher R. Glenbocki", insert --Attorney, Agent or Firm - Lowe, Price, LeBlanc & Becker--

Signed and Sealed this

Fourth Day of January, 1994

*Attest:*

BRUCE LEHMAN

*Attesting Officer*     Commissioner of Patents and Trademarks